July 31, 1962 G. W. JONES 3,046,903

ARTIFICIAL BLOOD CIRCULATION APPARATUS

Filed March 18, 1960 2 Sheets-Sheet 1

INVENTOR.
GEORGE W. JONES
BY Albert J. Kramer
ATTORNEY

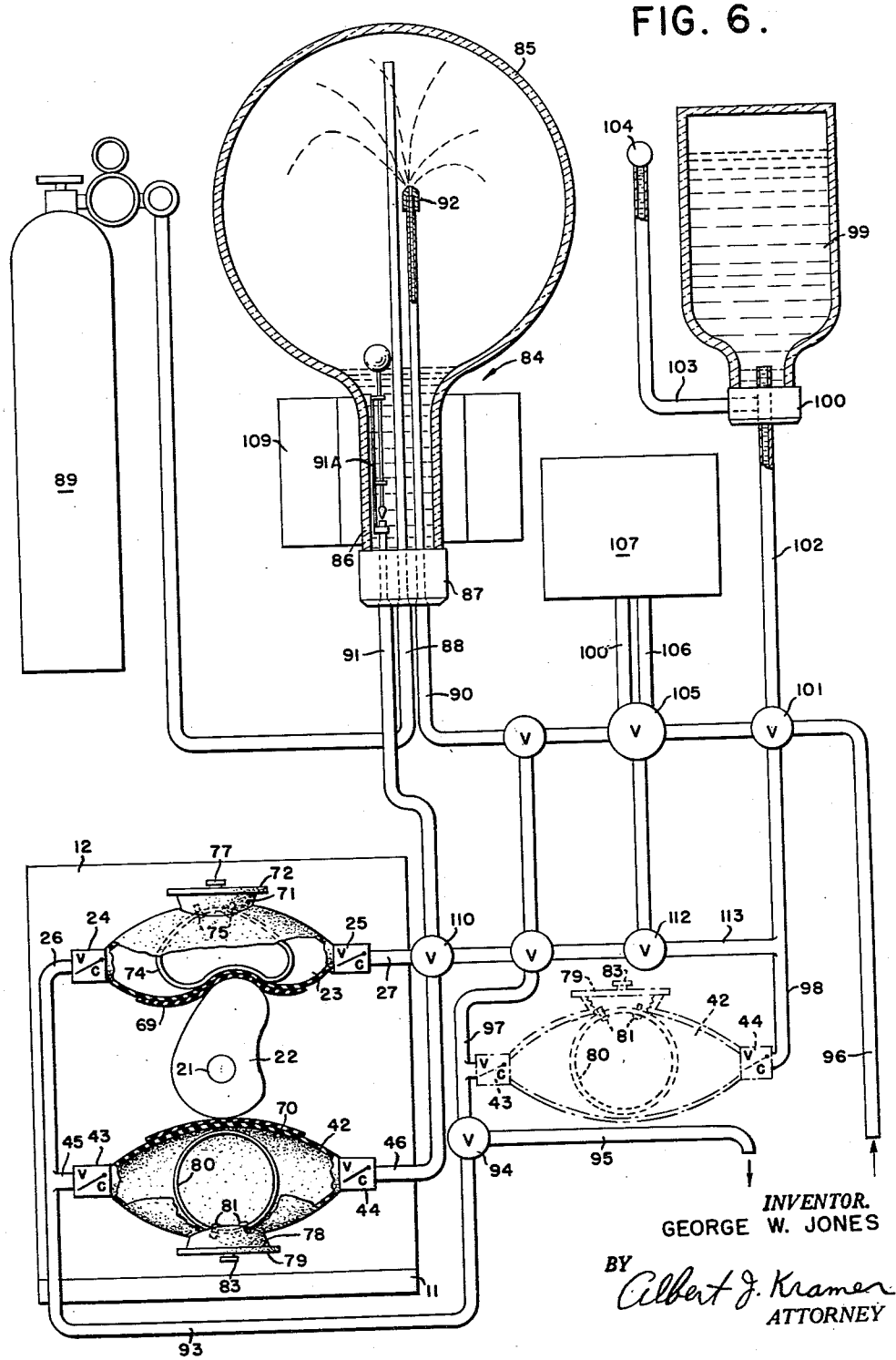

United States Patent Office 3,046,903
Patented July 31, 1962

3,046,903
ARTIFICIAL BLOOD CIRCULATION APPARATUS
George W. Jones, 503 Fairmont Ave.,
Winchester, Va.
Filed Mar. 18, 1960, Ser. No. 15,908
4 Claims. (Cl. 103—149)

This is a continuation-in-part of my copending application for patent Ser. No. 789,546, filed January 28, 1959 and now abandoned.

This invention relates to the circulation of blood and it is more particularly concerned with apparatus for taking over or assisting the functions of the heart and/or lungs of living humans and animals.

It is a well known fact that death results in a few minutes if any disease or accident causes interruption of the oxygen system of a human being. This interruption may be caused by obstruction to the airways of the lungs, or the transportation of oxygen to the body cells, by the blood. A wide variety of apparatus has been used for the pumping of blood, and especially apparatus for the pumping of blood through the circulatory system of the human body, have been suggested heretofore. Prior apparatus, however, has been found to cause physical trauma to the blood corpuscles. Such trauma is found in apparatus which causes damage by sudden positive or negative pressure due to shock and high pressure waves.

Similarly, chemical trauma to the blood corpuscles may initiate thrombosis, and material used in prior apparatus showed evidence of chemical change from the material which came in contact with the blood.

Hemolysis is also caused by previously known apparatus because of the abrupt changes in the parts of the pump and the tubing going to and from it.

The prior art indicates that previously known methods of pumping blood through the circulatory system of human beings by artificial means, has been found to be crude, bulky, too complex, and generally unsatisfactory. The art has long desired a simple apparatus that would serve the medical practitioner for emergency use, and also, as an essential part of auxiliary heart-lung mechanisms.

The art has also desired a simple apparatus that would serve as a blood pump and could be operated by hand, lever, or mechanical power, as desired.

It is therefore, a primary object of the invention to provide a device of this character that can be used to maintain the oxygen system in human beings by simulating the human heart.

It is an additional primary object of the invention to provide a method, and a device to function as a blood pump in a heart-lung mechanism.

It is also an object of the invention to provide a device that can supply oxygenated blood to the coronary arteries of the heart.

Although, perfusions in man and animals, using the continuous flow type of pump, have been carried out successfully, the pulsatile type gives the most natural flow. It is similar to the flow from the heart, and it must be assumed that the human body is adapted to it.

Although, it is possible that the pulsatile type flow has a beneficial effect on the activity of the kidneys, and may help promote lymph formation and absorption, the greatest benefit is derived by the coronary arteries. The coronary orifices are in such a position that the back pressure of the blood in the aorta against the closed aortic valves forces the blood through these openings, and the pulsatile flow from any blood pump should simulate these same pressures to maintain a sufficient flow of oxygenated blood through the coronary arteries to the heart muscle.

Accordingly, another object of this invention is to provide a device that will maintain a pulsatile flow of blood without causing a high degree of hemolysis.

A further object of the invention is to provide a device of this character that can be easily sterilized after use.

A still further object of the invention is to provide a device of the type mentioned having relatively few parts which may be readily assembled and disassembled, and will take up little space.

A still further object of the invention is to provide a device that is portable and can be easily carried about and operated at any location, irrespective of the availability of electrical energy.

A still further object of this invention is to provide a device that can be packed and carried in a handbag, such as is used by practicing medical physicians, and used as an emergency means for maintaining the circulation of the blood of the victim of an accident, until he can be transported to skilled medical service.

Still further objects of this invention are to provide a device that can be used as an auxiliary pump to pump blood from one blood vessel to another or from one area of the human body to another area; to prevent stagnation of the blood in some areas of the body, such as the extremities; to assist the human heart with its pumping job, when the heart muscle becomes too weak to carry the required pumping load; to pump blood quickly to the brain and other vital cells of the human body to keep these cells alive in the event of a cardiac accident or some other interruption to the oxygen system; to be used as an emergency means of preventing traumatic shock, by using it to pump blood from other areas of the body back to the head and chest areas; to assist the human heart in maintaining a rate of flow through the blood vessels that will be great enough to prevent blood fluids from permeating through some blood vessel walls into the body tissues; to maintain the blood circulation of the human body during cardiac or great vessel operations; to quickly carry off air bubbles from the apparatus into the atmosphere; to quickly add to the blood such chemicals as hormones, medicines, blood expanders, and blood as needed.

A feature of the invention consists in using as a pump chamber an elastic bag, such as those used for the storage and shipment of small quantities of blood.

Another feature of this invention is to provide a device of the type mentioned which can be made ready for use quickly.

Other objects, advantages, and features of the invention are accomplished by means of such structure and relative arrangements of parts as will be apparent from the following description in connection with the accompanying drawing.

In the drawing:

FIG. 6 is an elevational view, partly schematic and partly broken away of the complete embodiment.

Figure 1:
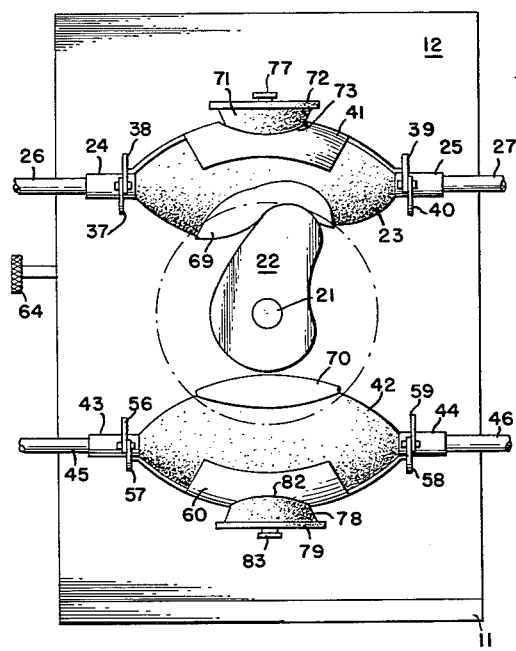
FIG. 1 is a front elevational view of a portion of an embodiment of the invention comprising the mechanical pump members.
Figure 2:
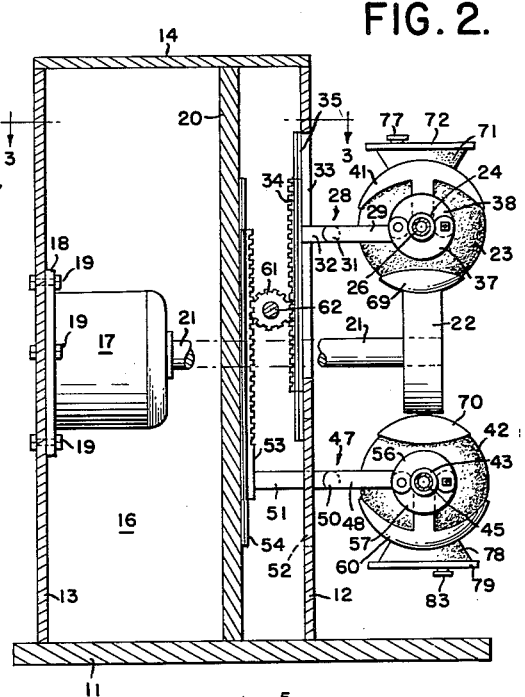
FIG. 2 is a longitudinal sectional view of the same portion of the embodiment along the line 2—2 of FIG. 3.

Referring with more particularity to the drawing in which like numerals designate like parts throughout the various views, the embodiment illustrated comprises a horizontal base 11 on which is mounted a vertical front panel 12 and a rearwardly offset vertical wall 13. The panel 12 and wall 13 are connected by a top wall 14 and side walls 15 and 16, forming thereby an enclosure for an electrical motor 17. The motor is mounted on the back wall 13 by conventional means, such as motor flange 18 and bolts 19.

Between the front panel 12 and the motor 17, an intermediate vertical partition 20 is disposed. The motor 17 has a horizontally extending take-off shaft 21 projecting through the partition 20 and also the panel 12. To the outer end of the shaft 21 there is attached for rotation therewith an eccentric or offsetting cam 22.

Directly above the cam 22, an upper pump chamber is disposed and it comprises a tubular elastic bulb 23 of rubber, polyethylene or other resiliently flexible material of oblong shape on the order of a conventional football. The ends of the bulb are provided with tubular extensions 24 and 25, respectively, which are adapted for connection to the ends of blood conveying tubes 26 and 27, respectively, and which also comprise check valves for the unidirectional flow of blood through the bulb.

The bulb 23 is mounted on a horizontal bracket 28 comprising arms 29 and 30 projecting outwardly from a connecting bar 31 parallel to the panel 12. A short stem 32, integral with the bar 31, projects rearwardly through a vertical slot 33 of the panel 12 and is secured to the back of a vertical rack 34. The rack 34 is slidably mounted between the back of the panel 12 and offset cleats or retainer strips 35 and 36 secured to the panel on opposite sides of the slot 33.

The outer ends of the bracket arms 29 and 30 are provided with pairs of pivoted clamp fingers 37, 38 and 39, 40 adapted to releasably engage the tubular extensions 24 and 25, respectively.

A cradle in the form of a metallic or other rigid plate 41 overlies the bulb 23 and it is secured to the inner finger clamp 38 on one side and to the inner finger clamp 39 on the other side.

Below the cam 22, there is similarly mounted a similar pump chamber comprising elastic bulb 42 having tubular extensions 43 and 44 for connecting pipes 45 and 46 and comprising similar check valves, mounting brackets 47 having arms 48 and 49, connecting bar 50 and stem 51 projecting rearwardly from the bar 50 through a second vertical slot 52 in panel 12 adjacent the slot 33 and secured to the bottom of a vertical rack 53. The rack 53 is slidably mounted on the front face of the intermediate partition 20 by means of offset cleats 54 and 55, substantially as shown.

The outer ends of the arms 48 and 49 are provided with pivoted clamp fingers 56, 57 and 58, 59 similar to those on the arms 29 and 30. A cradle 60, similar to cradle 41, underlies the bulb 42 and it is connected to the inner fingers 57 and 58.

Figure 3:
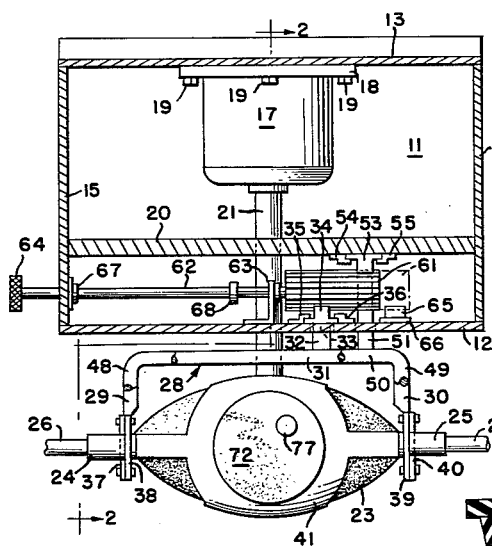
FIG. 3 is a plan sectional view of the same portion along the line 3—3 of FIG. 2.
Figure 4:
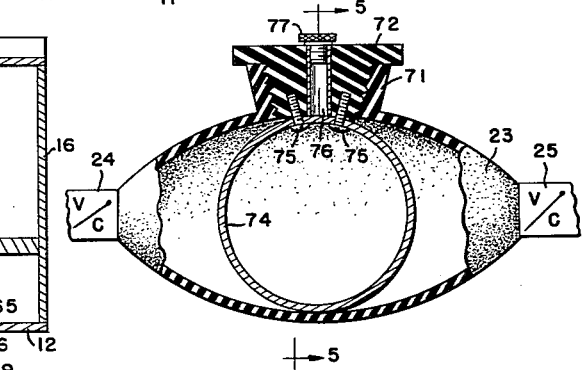
FIG. 4 is an elevational view, partly in section, of the upper pump chamber of the embodiment.
Figure 5:
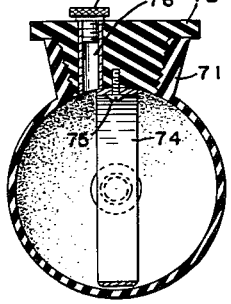
FIG. 5 is a vertical sectional view along the line 5—5 of FIG. 4.

An elongated pinion 61 is disposed between and it meshes with the teeth of the racks 34 and 53. The pinion 61 is carried on a shaft 62 for rotation therewith and it is rotatably supported between a bracket 63 at the back of the panel 12 and the side wall 15. The shaft 62 projects through the wall 15 and is provided on the exterior with a finger knob 64 to facilitate manual rotation which has the effect of moving the racks 34 and 53 in opposite directions and, therefore, adjusting the positions of the bulbs 23 and 42 relative to the cam 22 to vary the volume per stroke of fluid passing through the bulbs. They are maintained in adjusted positions by axial slidable movement of the shaft 62 in its bearings to engage the pinion 61 with a brake or holding member in the form of a locktooth 65 carried by a bracket 66 secured to and projecting rearwardly from the panel 12. (See dotted lines of FIG. 3.)

The axial movement of the shaft 62 is limited by spaced bosses or abutments 67 and 68 on the shaft.

On the sides of the bulbs 23 and 42 facing the cam 22, there are secured protective pads or shields 69 and 70, respectively, of flexible plastic or other suitable material attached by an adhesive or otherwise, for contacting the cam in order to avoid rupture of the bulbs by the rubbing and wearing action of the cam thereagainst.

The upper bulb 23 has an opening at the top surrounded by a wall 71 with which a plug 72 is threadedly engaged to seal the opening. The cradle 41 has an opening 73 therethrough through which the wall 71 protrudes. A resilient deformable ring 74 of spring steel, plastic, or other suitable resilient material is securely attached to the plug 72 by means of screw bolts 75.

A vent duct 76 extends from the bottom of the plug 72 to the top and is provided with a screw cap 77 so that the interior of the bulb may be selectively opened to the atmosphere for venting air bubbles above the level of liquid in the bulb. The air bubbles are eliminated by first removing the cap 77 and squeezing the bulb until all the air above the liquid level escapes as indicated by some of the liquid starting to flow out, whereupon the cap is replaced before releasing pressure on the bulb.

The lower bulb 42 has an opening at the bottom surrounded by a wall 78 in which a plug 79 is threadedly engaged to seal the opening, like the plug 72 and wall 71 of the upper bulb 23. Similarly, a resilient deformable ring 80, like the ring 74 is attached to the plug 79 by screw bolts 81. The wall 78 protrudes through an opening 82 in the cradle 60, similar to the opening 73 in the cradle 41.

The plug 79 similarly also has an air vent duct with a screw cap 83.

The bulbs 23 and 42 are connected by suitable tubes to an oxygenating unit 84 as schematically shown in FIG. 6. The oxygenator illustrated is on the type described in my Patent No. 2,827,901, granted March 25, 1958, and it comprises a bulbous member 85 having an inverted neck 86 and a closure member 87 through which an oxygen intake tube 88 extends from a source of oxygen 89; also an inlet tube 90 for the inflow of blood to be oxygenated and an outlet tube 91 for discharge of oxygenated blood. The inner end of the inlet tube 90 is fitted with a spray device or atomizer 92 to subdivide the blood as it escapes from the inlet tube and falls down through the oxygen atmosphere into the neck portion 86 that forms a reservoir from which the oxygenated blood is discharged through the outlet tube 91. This outward flow may be controlled in accordance with the liquid level by a float valve 91A of any conventional type.

Blood enters the bulb 42 through the tube 46 and valve in tubular extension 44. As the cam 22 presses against bulb 42 and compresses it, liquid is forced out through the valve in tubular extension 43 where it may be mixed with blood from the tube 26, or alone conveyed through tube 93 and valve 94 to the discharge terminal tube 95 which is connected to one side of the blood system of the human or animal body where the treated blood is returned. Blood is removed from the body system through a terminal intake tube 96 and carried by a system of tubes and valves, hereinafter more fully explained, to the oxygenating unit 84, thence to the pump and finally to the terminal discharge tube 95, thus completing the basic circulation system of the apparatus.

As indicated by the broken lines, the bulb 42 may be removed from its position below the cam 22 and transferred to a position in the circulatory system between tube branch 97 and extension branch 98 whereby the bulb may be actuated by hand.

Between the terminal tubes 95 and 96, the pump bulbs 23 and 42, and the oxygenator unit 84, there is provided a system of tubes and valves by means of which a number of operational variations may be selectively employed. These include the addition of supplemental blood, blood expanders, plasma or serum, to the blood stream from a reservoir 99, with or without the introduction of medicinal or nutritional agents, such as anti-coagulants, vitamins, glucose, hormones, etc. This system of tubes and valves also enables the pumping operation to the performed exclusively by mechanical action of the cam 22 against the bulbs 23 and 42, or manually by hand operating the bulb 42 between the branches 97 and 98, as explained above, or by a combination of both the mechanical means and the hand pump.

The reservoir 99 has a bottom closure cap 100 and it is connected to a valve 101 in the intake tube 96 by a vertical tube 102 passing through the cap. A tube 103 is connected to the tube 102 through the cap 100 to permit the equilization of air pressure with the exterior through an air vent 104.

Should it be desired to remove gases from the blood, such as carbon dioxide, the blood flow may be shunted by shunt valve 105 through tube 106 to degasifier 107 of any conventional type. The degassed blood is returned to the blood stream through tube 108 and the valve 105. Alternatively, carbon dioxide may be removed from the blood in the oxygenation unit 84, instead of by the degasifier 107.

The function of the resilient rings 74 and 80 within the bulbs 23 and 42 are to apply outward force against the walls of the bulbs after they have been collapsed by the cam 22 or by hand, as the case may be. As each bulb returns to its original shape, after being compressed by the cam or by hand, a negative pressure is developed within the bulb. But if the positive pressure on the liquid entering the bulb through the valves in tube extensions 25 and 44 is not sufficient to expand the walls of the bulbs, it will remain collapsed and inoperative for the next stroke. Therefore, the resilient rings tend to force the walls of the bulbs outward against any tendency for them to remain collapsed.

In FIG. 6 the lower bulb 42 is illustrated by dotted lines in an alternate position between tube branches 97 and 98 for manual operation. In this position, the bulb is simply held in the hand by the operator and alternately compressed and released. This may be done either in conjunction with the mechanical actuation of the upper bulb 23 or in substitution thereof.

The temperature of the liquid in the neck of reservoir 86 of the oxygenator 84 may be regulated by a heat exchanger 109 surrounding the neck. This heat exchanger may be a hot or cold fluid jacket, an electrical heating element, cooling coils, or any other adaptable conventional means for adding or subtracting heat as may be required.

The apparatus may be used with only one of the bulbs operated mechanically or manually, with both bulbs operated mechanically, or with one operated mechanically and the other manually. If only one is used mechanically, say bulb 23, blood passes through tube 27 from valve 110, then through valve in tube extension 25, and then into the bulb where it is forced out through valve in tube extension 24. If both bulb pumps are mechanically operated, part of the blood flows through tube 27 and the other part through tube 46. After these blood portions pass through their respective blood pumps 23 and 42, they are discharged into the tube 93 through valves in the tube extensions 24 and 43, respectively, and then to the terminal delivery tube 95, as explained above.

If manual operation alone is used, blood passes from terminal intake tube 96 through valve 101 into tube 98 directly, or by first passing degasser unit 107, thence to valve 112 into branch tube 113 connected to tube 98. It leaves the bulb 42 through the check valve in tubular extension 43 from whence it flows through the valve 94 to the terminal delivery tube 95.

By manipulating the valves provided, it may be readily seen by inspection of the drawing, that the flow of blood can be controlled to pass through or to by-pass the degasser 107 and/or the oxygenator 84. Also, there can be incorporated in the stream of blood material from the reservoir 99 as may be needed.

Having thus described my invention, I claim:

1. A device of the character described comprising a chamber having resiliently collapsible walls, means on the exterior of the chamber for applying pressure against the resilient action of the walls to compress the chamber from an unstressed normal condition and alternately to release the pressure and permit the chamber to recover its normal condition under the resilient action, tubular valved means connected to the chamber for conveying fluid into and out of the chamber unidirectionally, said chamber having an access opening therein, a removable plug within said opening, said plug having a passageway therethrough from the exterior to the interior of the chamber, and a removable closure member in said passageway.

2. In a device for the pumping of blood, a pump chamber comprising an elastic tube, external pressure means for compressing the tube, an internal resilient member for distending the tube, valve means connected to the tube for controlling the passage of liquid through the tube, said tube having an opening therein, a closure member for the opening, said internal resilient member being attached to the closure member on the interior of the tube.

3. A pumping device comprising a frame, a pump chamber in the form of an elastic tube positioned on said frame, pressure means for compressing the elastic tube and thereby tending to expel liquid from the tube, internal resilient means for distending the tube from a compressed condition to a normal uncompressed condition, valve means connected to the tube for controlling the passage of liquid through the tube, said tube having an opening therein, a closure member for the opening, said closure member having a passageway therethrough from the interior to the exterior of the tube, means for releasably closing the passageway, said internal resilient member being attached to said closure member, said pressure means comprising a rotatable cam, and means for rotating the cam.

4. A pumping device comprising a frame, a pump chamber comprising a wall in the form of an elastic egg-shaped hollow vessel, said vessel being positioned on said frame, tubular members connected to opposite longitudinal ends of the vessel, said tubular members communicating with the interior of the vessel, pressure means for transversely compressing the vessel, said tubular members having valves therein to cause liquid on the interior of the vessel to flow through the vessel under the influence of the pressure means unidirectionally from one longitudinal end to the other, internal resilient means for distending the vessel from a compressed condition to a normally uncompressed condition, the wall of said vessel having an opening therein between its longitudinal ends, a closure member for the opening, said closure member having a passageway therethrough from the exterior to the interior of the vessel, means for releasably closing the passageway, said internal resilient member being attached to said closure member, said pressure means comprising a rotatable cam, and means for rotating the cam.

References Cited in the file of this patent

UNITED STATES PATENTS

| 238,639 | Boerner | Mar. 8, 1881 |
| 328,472 | Faller | Oct. 20, 1885 |
| 496,559 | Fraser et al. | May 2, 1893 |
| 1,976,416 | Scott | Oct. 9, 1934 |
| 1,988,624 | Kipp | Jan. 22, 1935 |
| 1,991,278 | Heintz | Feb. 12, 1935 |
| 2,668,637 | Gilmore | Feb. 9, 1954 |
| 2,842,267 | Shire | July 8, 1958 |
| 2,877,714 | Sorg | Mar. 17, 1959 |
| 2,921,529 | Bennett | Jan. 19, 1960 |
| 2,927,582 | Berkman et al. | Mar. 8, 1960 |
| 3,009,459 | Ruben | Nov. 21, 1961 |

FOREIGN PATENTS

| 336,394 | France | Jan. 14, 1904 |
| 800,805 | Germany | Dec. 7, 1950 |